Figure 1:
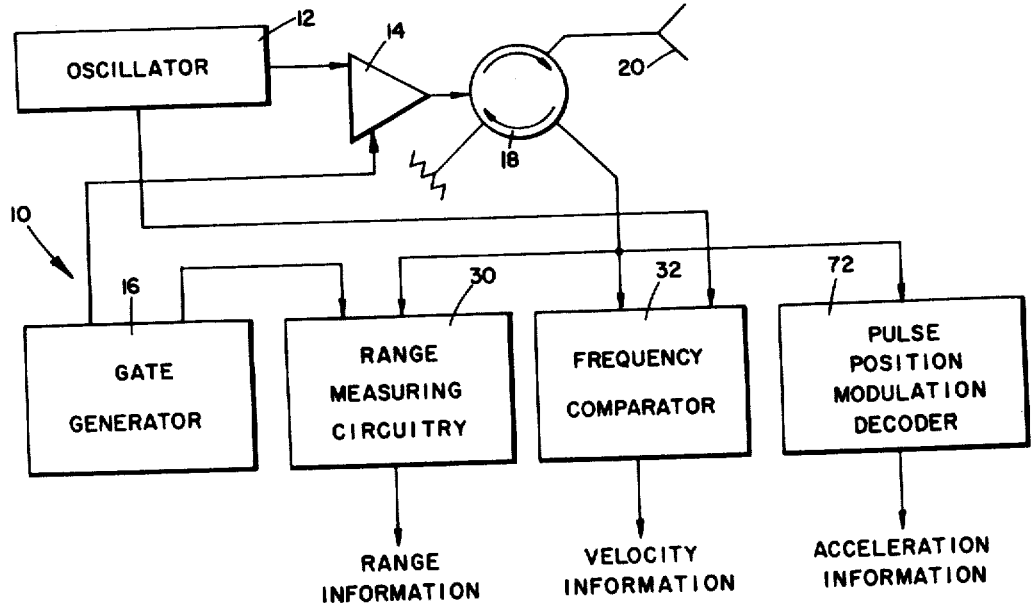

May 18, 1965  C. H. CHILD  3,184,737
RADAR SYSTEM

Filed March 28, 1963  2 Sheets-Sheet 1

INVENTOR.
CLAUDE H. CHILD
BY Sidney Magnus
AGENT

May 18, 1965 C. H. CHILD 3,184,737
RADAR SYSTEM
Filed March 28, 1963 2 Sheets-Sheet 2
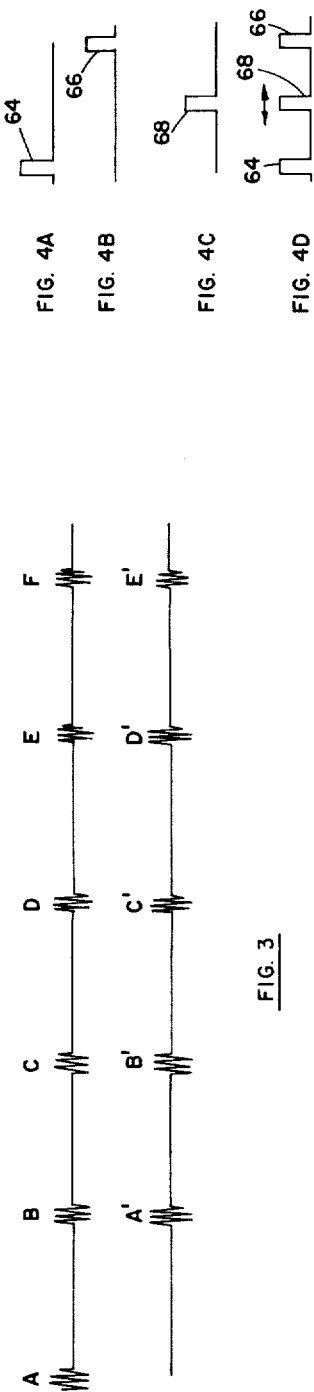
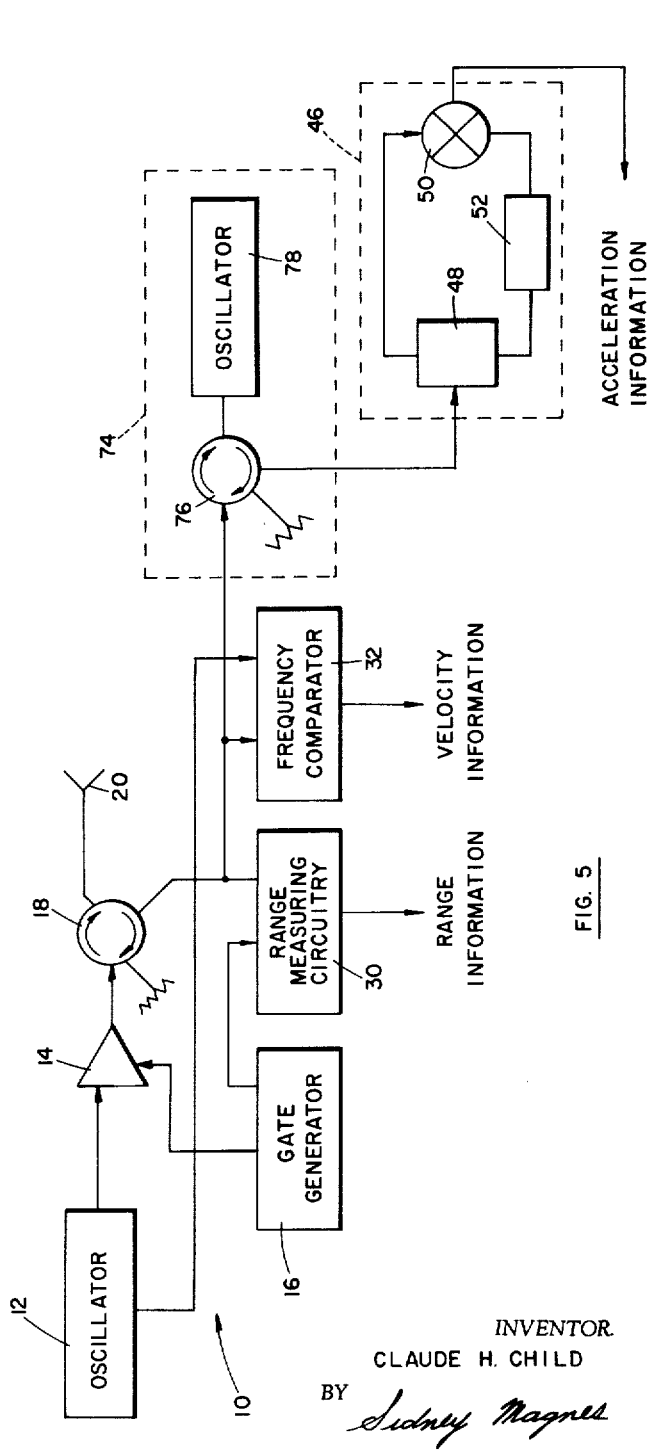
INVENTOR.
CLAUDE H. CHILD
BY Sidney Magnes
AGENT

United States Patent Office 3,184,737
Patented May 18, 1965

3,184,737
RADAR SYSTEM
Claude H. Child, Paramount, Calif., assignor to
North American Aviation, Inc.
Filed Mar. 28, 1963, Ser. No. 268,814
4 Claims. (Cl. 343—6.8)

This invention relates to a radar system; and more particularly to means for obtaining the distance, relative velocity, and relative acceleration of a target.

It is well-known to utilize a radar system to detect targets, such as ships, airplanes, missiles, and the like. In those cases where the target is a ship that is moving relatively slowly, it is sufficient to know the target's location and approximate path. In other cases, where the target is a fast-flying airplane, it is desirable to also know the relative velocity of the target; and whether it is moving toward or away from the radar station. In still other cases, such as arise in space exploration, refueling of airplanes, and airplane collision-avoidance systems, it is also desirable to know not only whether the target is approaching or receding, but also the relative acceleration between the two vehicles.

It is relatively easy for radar to measure the distance, or "range," to a target. To achieve this, energy is directed toward the target, which reflects some of the energy back to the radar station. This reflected "echo" energy is received, and a measure is made of the time interval between transmission and reception of the radar wave; this time interval being indicative of the distance the energy has traveled to and from the target.

In order to measure the relative velocity of the target, the range information undergoes an electronic process known as "differentiation." Unfortunately, electronic differentiation introduces an error; and therefore the derived velocity is less precise than the range information from which it was obtained.

In order to measure the relative acceleration of the target, the velocity (obtained as described above) is differentiated. Unfortunately, this second differentiating process introduces an additional error; so that the resultant relative acceleration is even less precise than the velocity information.

As may be understood, the above process provides range, velocity, and acceleration; but the results become progressively less trustworthy.

In order to overcome the above shortcomings, a method known as "Doppler Radar" was introduced. The Doppler concept is based upon the fact that when a signal of a given frequency is reflected by a moving target, the reflected echo signal has its frequency changed.

The frequency of the echo signal is increased when the target is proceeding toward the radar station; whereas the frequency of the echo signal is decreased when the target is moving away from the radar station.

It can be seen that the Doppler change in frequency of the echo signal provides another way of obtaining the relative velocity between the target and the radar station, without using the differentiating process. However, in order to obtain the relative acceleration, the differentiating process must be used; and it introduces the same error that was mentioned above.

Objects and drawings

It is therefore the principal object of the invention to provide an improved radar system for providing range, velocity, and acceleration information.

Figure 2:
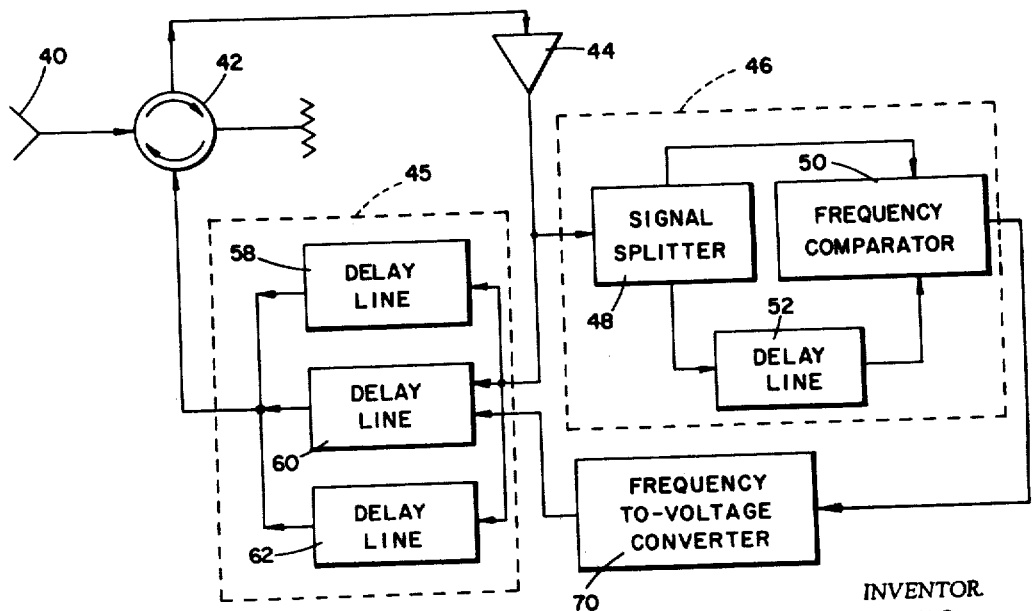

The attainment of this object and others will be realized from the following specification, taken in conjunction with the drawings, of which FIG. 1 shows an exemplary radar station;
FIG. 2 shows an exemplary transponder;
FIGS. 3 and 4 show waveforms associated with the invention; and
FIG. 5 shows another way of practicing the invention.

The instant invention contemplates a radar system wherein the range to a target is obtained by measuring the time interval between the transmission and the reception of radar energy; the relative velocity of the target is obtained by means of the above-described Doppler concept; and the relative acceleration of the target is obtained by comparing the frequency of successive bursts of energy received by or from the target.

The invention will first be described in terms of two friendly vehicles, such as a spacecraft approaching a space station. The spacecraft has a radar system, portions of which are shown in FIG. 1.

Radar system 10 comprises a master oscillator 12 that provides a signal of a desired frequency, the signal from oscillator 12 being applied to an amplifier 14 that amplifies the signal to the extent desired. A "gate" generator 16 provides a gating signal that gates amplifier 14 on and off at a given rate, to produce bursts (or pulses) of energy of the desired frequency; these pulses occurring at a given "pulse-repetition-rate," the time interval between these pulses being known as the "pulse-repetition period."

The gating signal may be of the type that produces bursts, or pulses, of radar energy; or alternatively, it may phase-modulate or frequency-modulate the radar energy. For ease of explanation, the invention will be discussed in terms of bursts, or pulses; but the term "sample" will be understood to designate a packet of energy formed by a suitable gating process.

The pulses of energy are passed thru a suitable energy-directing device, such as a circulator 18, whose operation will be more fully described later. Circulator 18 directs the bursts of energy to an antenna 20 that transmits the bursts of energy outward toward the space station that is being approached.

In accordance with the radar principle, the energy that impinges upon the space station is reflected, and some of the reflected energy—known as the echo signal—impinges onto antenna 20. The echo signal is applied to circulator 18, which directs it to suitable utilizing circuitry, such as range measuring circuitry 30, frequency comparator 32, and pulse-position-modulation decoder 72—whose operations will be described later.

As discussed above, range-measuring circuitry measures the time interval between the transmission of the energy and the reception of the echo signal. Therefore, the instant that energy is transmitted, a trigger signal from gate generator 16 is applied to range-measuring circuitry 30 to initiate the timing circuits. Thus, the time interval between the occurrences of the trigger signal and the reception of the echo signal is measured; and the output of range-measuring circuitry 30 is a signal that indicates the range of the target.

As has been indicated, the relative velocity between the two vehicles can be measured by comparing the frequency of the transmitted signal and the frequency of the received echo signal. To achieve this, a sample of the signal from oscillator 12 is applied to a frequency comparator 32; and a sample of the echo signal received by antenna 20 is directed by circulator 18 to frequency comparator 32. The inherent operation of comparator 32 is such as to produce an output signal having a frequency that is the difference between the frequency of the oscillator signal and the frequency of the received echo signal. Thus, the output signal from comparator 32 is an indication of the velocity of the spacecraft relative to the space station.

Turning our attention now to the target, that is, the space station, it has a so-called "transponder" which has the characteristic that when it receives a signal, it responds by transmitting its own signal. Such a transponder is shown in FIG. 2.

The operation of finding the relative acceleration between the vehicles is as follows. A portion of the signal transmitted by the radar system is intercepted by the transponder's antenna 40 (FIG. 2) and is applied to a circulator 42 that feeds it to an amplifier 44, whose output is applied to two separate units: a "pulse-position-generator" unit 45, and an accelerometer unit 46.

Consider first the accelerometer 46. This comprises a signal-splitting circuit 48, such as a magic T. One output of the signal-splitting circuit 48 passes directly to a frequency comparator 50; and for convenience this portion of the split signal will be called the "direct" signal. The other output from the signal-splitting circuit 48 passes thru a delay line 52, and thence to frequency comparator 50; and this portion of the split signal will be called the "delayed" signal. Delay line 52 has the characteristic that it delays the signal for the time interval between subsequent pulses produced by the radar system 10, that is, for the pulse-repetition-period.

Assume first, that the two vehicles are moving in such a manner that there is no relative movement between them, which means there is no relative acceleration. A first burst of energy from the radar system 10 impinges upon the transponder antenna 40, and is directed to the signal splitter 48. The direct portion A of the pulse enters the comparator 50 where it has no effect; and the delayed portion A' of the pulse passes thru delay line 52, where it is delayed for a time interval exactly equal to the period between adjacent pulses from radar system 10. As a result, as illustrated in FIG. 3, the second direct pulse, B, reaches comparator 50 at the same instant that the first delayed pulse A' is applied to comparator 50. Similarly, delayed pulse B' coincides time-wise with direct pulse C. Subsequent direct and delayed pulses have the same type of time-coincidence.

Frequency comparator 50 of FIG. 2 compares the frequency of the direct pulse with the frequency of the time-coincident delayed pulse; and, since it was assumed that there was no relative motion between the vehicles, the frequency of these pulses is the same. Depending upon its design, comparator 50 produces a given output signal that indicates there is no relative acceleration between the two vehicles.

Assume secondly, that the spacecraft is approaching the space station at a constant velocity, which also means that there is no relative acceleration. Under this condition, the signals from radar system 10 are impinging on transponder antenna 40 at a frequency that is higher, but constant, compared to the frequency in the previous example; although the impingement is at substantially the same pulse-repetition rate. As a result the coincident direct and delayed pulses again have the same frequencies, although the frequency is higher than in the previous example. Since these frequencies are the same, there is the same given output signal from comparator 50, again indicating there is no relative acceleration between the two vehicles.

Assume thirdly, that the spacecraft is approaching the space station at a constantly increasing velocity, that is, it is accelerating. As a result of the previously mentioned Doppler effect, the signals impinging upon transponder antenna 40 have an increasingly-higher frequency. Thus each direct pulse applied to comparator 50 has a somewhat higher frequency than its time-coincident delayed pulse. The frequency comparator 50 therefore produces an output signal whose frequency depends upon the difference between the frequencies of the time-coincident direct and delayed pulses.

If the spacecraft is accelerating slowly, there is a small frequency-difference between the direct and delayed pulses; and a low-frequency output signal is produced by frequency comparator 50. If, on the other hand, the spacecraft is accelerating rapidly, there is a large frequency-difference between the direct and delayed pulses; and a higher-frequency output signal is produced by frequency comparator 50.

If the spacecraft were decelerating, the delayed pulse would have a higher-frequency than the direct pulse; and the output of the frequency comparator 50 would also indicate this, for example, by superposing the output signal onto a D.C. component that indicates which of the time-coincident pulses has the higher frequency.

Thus, the output from comparator 50 is indicative of the acceleration.

The output of accelerometer unit 46 may be encoded and transmitted back to radar system 10 in any suitable manner; FIG. 2 showing a system known as "pulse-position-modulation." To achieve this result, attention is directed to pulse position generator unit 45, which is the second unit to which the output of amplifier 44 is directed.

As shown in FIG. 2, pulse position generator 45 comprises three delay lines 58, 60, and 62; each of which receives the output of amplifier 44. Delay line 58 has a relatively short delay, so that it produces an early pulse 64, as shown in FIG. 4A. Delay line 62 has a relatively long delay, so that it produces a late pulse 66, as shown in FIG. 4B.

The output from accelerometer unit 46 in FIG. 2 is applied to a frequency-to-voltage converter 70 whose output is applied to delay line 60. Since converter 70 is controlled by the frequency of the output from accelerometer 46, and produces a corresponding output voltage, this voltage is used to terminate the delay of the controlled-delay line 60, and to thus position a third pulse, 68, of FIG. 4C, between pulses 64 and 66. The position of this third pulse 68 is thus determined by the frequency of output of accelerometer 46. Thus the output of the pulse-position generator 45 appears as shown in FIG. 4D. The first and third pulses 64 and 66 always appear the same distance apart, and indicate to the receiving circuitry of the radar system, the beginning and the end of this bit of acceleration information. The second pulse 68 is positionable between the first and third pulse, as indicated by the double-ended arrow; its position depending upon the output of frequency comparator 50, which is in turn dependent upon the relative acceleration between the two vehicles.

Various forms of controlled delay lines are known, one simple one comprising a transmission line having lumped parameters; the value of the capacitive parameters being voltage-sensitive and controlled by the output voltage of converter 70.

The acceleration-signal encoded waveform of FIG. 4D is applied to circulator 42 of FIG. 2 and is directed to transponder antenna 40; from whence it is transmitted, and is received by antenna 20 of the radar system of FIG. 1. Here the received pulse-position-modulated acceleration signal is applied to circulator 18, which directs it to a pulse-position-modulation decoder 72; this having the characteristic that it decodes the pulse-position-modulated signal 64, and produces an output that is an indication of the relative acceleration between the two vehicles.

Alternatively, the range and velocity information may also be obtained from the transponder's signal (FIG. 4D), rather than from the echo signal, as the transponder's signal may be of greater strength. To get the range in this way, the first pulse, 64 of FIG. 4, may be used to measure the time-interval; although in this case an allowance must be made for the delay between the time the transponder receives the radar signal and the time it transmits the first pulse (e.g., the response time of the transponder).

The relative velocity may be obtained by comparing the frequency of the transponder's signal with the frequency of the oscillator 12 (of FIG. 1).

It may thus be seen that the invention as thus far described will give the desired information for friendly vehicles such as the space vehicles described, friendly airplanes, airplanes that are part of a collision-avoidance system, etc.

There are other cases, however, where range, velocity, and acceleration information is desirable, but where the vehicles are unfriendly; as for example a missile and an anti-missile. In still other cases, it may be desirable from a consideration of weight and space requirements that all the equipment be located on the space station, on a tanker, or at an airport. In situations such as these, the acceleration-indicating circuitry of FIG. 2 may be incorporated into the radar system of FIG. 1, in order to obviate the need of a transponder on the target.

One such arrangement is shown in FIG. 5. Here the reflected echo signal from the target is passed thru suitable circuitry at the radar station, and produces range, velocity, and acceleration in accordance with the principles described above.

FIG. 5 shows, instead of amplifier 44 of FIG. 2, a circuit 74 known as a "locked oscillator," which has certain advantages under some conditions. In operation, a portion of the echo signal that impinges upon antenna 20 is directed by circulator 18 to locked oscillator 74, which comprises a circulator 76 and a local oscillator 78. The circulator 76 applies a portion of the echo signal to local oscillator 78, which thereupon oscillates in phase and in synchronism with the echo signal applied to it. The output of local oscillator 78 is then applied to circulator 76, which directs it to the signal-splitter 48 of accelerometer unit 46, which operates in the same manner as previously described. The locked oscillator arrangement has the advantages of greater phase stability at any given level, and has an output whose amplitude is relatively independent of the input. It is more fully described in the article "Design and Performance of Phase-Locked Circuits Capable of Near Optimum Performance Over a Wide Range of Input Signals and Noise Levels"—Jaffe and Rechtin, IRE Transactions on Information Theory, March 1955.

The circulators used in this invention are devices for directing specific inputs to specific output ports. For example, directing attention to circulator 18 of FIG. 5, a signal from amplifier 14 enters circulator 18, circulates in the direction of the curved arrows, and leaves at the next port, to be applied to antenna 20. In a similar manner, the echo signal from antenna 20 enters circulator 18, circulates in the direction of the curved arrows, and leaves at the next port, to be applied to the various utilization circuits. In case any signals enter the circulator from the utilization circuits, these signals also circulate in the direction of the curved arrow, and leave the next port, to be dissipated in the dummy load.

Thus the circulator directs each signal to the desired location. The other circulators of FIGS. 1, 2 and 5 operate in the same manner.

A more detailed description of circulators may be found in "Ferrites—An Introduction for Microwave Engineers"—Waldron, page 188 et seq.

Although the invention has been described and illustrated in detail, it is to be clearly understood that the same is by way of illustration and example only, and is not to be taken by way of limitation; the spirit and scope of this invention being limited only by the terms of the appended claims.

I claim:
1. In a radar system having sequential samples of radar energy separated by a given pulse repetition period, apparatus for measuring the relative acceleration between two vehicles comprising signal splitting means for splitting an incoming signal into two portions;
a frequency comparator;
a first means for applying one portion of said split signal directly to said frequency comparator, said portion being designated as the direct signal;
a first delay line having a delay interval equal to said pulse repetition period of said radar system;
second means for applying the other portion of said split signal to said frequency comparator through said delay line, said portion being designated as the delayed signal—whereby the direct signal of one sample is applied to said frequency comparator at the same time as the delayed signal from the preceding sample is applied to said frequency comparator;
third means, comprising said frequency comparator, for comparing the frequency of the direct signal of one sample with the frequency of the delayed signal of the preceding sample, and producing an output signal having an amplitude corresponding to the frequency difference between said direct and delayed signals;
a second delay line having a fixed delay;
a third delay line having a fixed delay that is longer than the delay of said second delay line;
a fourth delay line having a controllable delay;
fourth means for applying said incoming signal to said second, third, and fourth delay lines; and
fifth means for applying siad output signal to said fourth delay line.

2. In a radar system having sequential samples of radar energy separated by a given pulse repetition period, the combination comprising
(A) time-measuring means for obtaining range information;
(B) first Doppler means for obtaining relative velocity information;
(C) second Doppler means for obtaining relative acceleration information and including acceleration-signal encoding means, said acceleration-signal encoding means being positioned on a target, and comprising
(1) signal splitting means for splitting an incoming signal into two portions;
(2) a frequency comparator;
(3) first means for applying one portion of said split signal directly to said frequency comparator, said portion being designated as the direct signal;
(4) a first delay line having a delay interval equal to said pulse repetition period for said radar system;
(5) second means for applying the other portion of said split signal to said frequency comparator through said first delay line, said portion being designated as the delayed signal—whereby the direct signal of one sample is applied to said frequency comparator at the same time as the delayed signal from the preceding sample is applied to said frequency comparator;
(6) means, comprising said frequency comparator, for comparing the frequency of the direct signal of one sample with the frequency of the delayed signal of the preceding sample, and producing an output signal having an amplitude corresponding to the frequency difference between said direct and delayed signals;
(7) a second delay line having a fixed delay;
(8) a third delay line having a fixed delay that is longer than the delay of said second delay element;
(9) a fourth delay line having a controllable delay;
(10) means for applying said incoming signal to said second, third, and fourth delay lines;
(11) means for applying said output signal to said fourth delay line—whereby an encoded acceleration-signal is produced; and
(12) means, located at a radar station, for decoding said encoded acceleration signal.

3. In a pulsed radar system, apparatus useful for measuring the relative range, velocity and acceleration between two vehicles comprising A first delay line responsive to a received signal for providing a first time delay thereof equal to the pulse repetition period of said radar system;

Frequency comparator means responsive to both said received signal and the output of said first delay line for generating a signal having an amplitude indicative of the frequency difference therebetween;

Second and third delay lines responsive to said received signal for providing fixed delays thereof, the fixed delay of said third delay line being longer than that of said second delay line; and A fourth voltage-controlled delay line responsive to said received signal and having a control input responsively coupled to said frequency comparator means.

4. In cooperation with a pulsed radar system, transponder means for generating a pulse-position-coded acceleration signal comprising A first delay line responsive to a signal received from said radar system for providing a fixed time delay thereof equal to the pulse repetition period of said radar system;

A frequency comparator responsive to both said received signal and the output of said first delay line for generating a signal frequency indicative of the frequency difference therebetween;

Analog frequency-to-voltage converter means coupled to the output of said comparator for providing an analog voltage having an amplitude indicative of said frequency difference; and Voltage-controlled delay means responsive to said received signal and having a control input operatively coupled to the output of said converter means for delaying said received signal by an amount corresponding to the relative acceleration between a transmitter of said radar system and said transponder.

References Cited by the Examiner

UNITED STATES PATENTS

| | | | |
|---|---|---|---|
| 2,517,540 | 8/50 | Busignies | 343—6 |
| 3,089,029 | 5/63 | Brinker | 343—8 |
| 3,099,832 | 7/63 | Frelick | 343—9 |

CHESTER L. JUSTUS, *Primary Examiner.*